(12) United States Patent
Fenten et al.

(10) Patent No.: US 6,830,739 B1
(45) Date of Patent: Dec. 14, 2004

(54) METHOD OF REDUCING THE DUST GENERATION OF SILICATES

(75) Inventors: Norbert Fenten, Elsdorf (DE); Wilfried Wolf, Hürth (DE)

(73) Assignee: Quarzwerke GmbH, Frechen (DE)

( * ) Notice: Subject to any disclaimer, the term of this patent is extended or adjusted under 35 U.S.C. 154(b) by 0 days.

(21) Appl. No.: 09/937,387

(22) PCT Filed: Feb. 26, 2000

(86) PCT No.: PCT/EP00/01616

§ 371 (c)(1),
(2), (4) Date: Sep. 25, 2001

(87) PCT Pub. No.: WO00/58396

PCT Pub. Date: Oct. 5, 2000

(30) Foreign Application Priority Data

Mar. 26, 1999 (DE) .......................... 199 13 810

(51) Int. Cl.$^7$ .............................................. C01B 33/20
(52) U.S. Cl. ....................................... 423/326; 422/331
(58) Field of Search .............................. 423/326, 324, 423/331; 106/481, 482, 483

(56) References Cited

U.S. PATENT DOCUMENTS

| 4,184,880 | A | | 1/1980 | Huber et al. | |
|---|---|---|---|---|---|
| 4,677,095 | A | * | 6/1987 | Wan et al. | 502/262 |
| 5,071,891 | A | * | 12/1991 | Harrison et al. | 523/209 |
| 5,281,478 | A | | 1/1994 | Höhner et al. | 428/404 |
| 5,387,467 | A | | 2/1995 | Höhner et al. | 428/391 |
| 5,905,104 | A | * | 5/1999 | Eklund et al. | 523/435 |
| 6,291,019 | B1 | * | 9/2001 | Locke et al. | 427/385.5 |
| 2003/0085384 | A1 | * | 5/2003 | Burnell-Jones | 252/301.36 |

FOREIGN PATENT DOCUMENTS

| DE | 34 39 745 | 5/1985 |
|---|---|---|
| EP | 0 591 676 | 4/1994 |
| EP | 0 843 029 | 5/1998 |
| EP | 0 913 431 | 5/1999 |
| GB | 2 284 214 | 5/1995 |

OTHER PUBLICATIONS

Metcalfe, E., "Silicon–based flame retardants," *Chemical Abstracts*, Columbus, Ohio 1988, vol. 129, No. 7; XP002142088 abstract & Recent Adv. Flam Retard. Polym. Mater., 1997, vol. 8:129–35, no month.

* cited by examiner

*Primary Examiner*—Stanley S. Silverman
*Assistant Examiner*—Edward M. Johnson
(74) *Attorney, Agent, or Firm*—Sutherland Asbill & Brennan LLP (57) ABSTRACT

The present invention relates to the reduction of the dust generated by silicates, according to the method of the present invention the crushed silicate is surface-coated with a polyorganociloxane also related to a silicate with reduced dust generation and the use of a reduced dust silicate as reinforcing filler in plastic materials.

5 Claims, 5 Drawing Sheets

METHOD OF REDUCING THE DUST GENERATION OF SILICATES

FIELD OF THE INVENTION

The invention is directed to a method of reducing the dust behavior of silicates. The invention is also directed to a silicate having reduced dust behavior.

Silicates, particularly needle-shaped silicates such as wollastonite, which is a chain silicate, are being employed as reinforcing fillers in plastic uses.

Wollastonite is a natural calcium silicate of formula $Ca_3[Si_3O_9]$. Monoclinic wollastonite is comprised of $SiO_4$ tetrahedrons linked in a three-membered arrangement of formula $[Si_3O_9]^{6-}$ wherein the individual chains are linked via $Ca^{2+}$ ions. This explains why wollastonite particles may have a needle-shaped structure.

In addition, wollastonite has beneficial material properties, including the absence of chemically bound water which in other hydrous silicates gives rise to changes in structure by loss of water upon heating. When incorporated in plastic materials, the result would be that a reinforcing effect no longer could be achieved. Further advantages are a low degree of shrinkage upon drying and heating, an exceedingly low expansion coefficient, and high mechanical properties of manufactured plastic products including wollastonite. In addition to its use as an additive in plastic materials, wollastonite is also used in the manufacture of ceramic products, sanitary articles, and porcelain.

The present invention predominantly relates to the use of wollastonite in plastic materials.

In such uses, wollastonite as a filling material is produced by grinding recovered wollastonite, followed by air classification. As a result, needle-shaped wollastonite particles are obtained, which either are incorporated directly in the plastic mixture or incorporated in the plastic materials in the form of polymer masterbatches including levels of from 10 to 40 wt.-% of wollastonite. Owing to the needle-shape structure of wollastonite, a substantial improvement in the mechanical properties is achieved in the plastic material and plastic molded articles produced therefrom.

BACKGROUND OF THE INVENTION

In addition, according to the prior art, wollastonite frequently is coated with silane compounds in order to achieve improved incorporation in the plastic material. To this end, surface coating using aminosilane, epoxysilane, methacrylic silane, trimethylsilane, vinylsilane, or alkylsilane is performed.

However, these prior art silicate materials involve the disadvantage of exhibiting increased dust formation due to an increased dispersity as a result of silane coating. The dust portion is comprised of most finely particulate silicate particles essentially lacking the needle-shape structure and therefore being incapable of inducing any reinforcing effects in the plastic material. That is, part of the silicate filler is not effective, acting merely as a non-reinforcing powdered filling material.

SUMMARY OF THE INVENTION

Initially, attempts have been made to overcome this drawback by subjecting wollastonite to various procedures in order to decrease the dust behavior. However, such procedures are relatively costly and expensive, thereby resulting in a substantial rise in cost of this raw material, rendering it useless as reinforcing filler in plastic materials for cost reasons. Therefore, this raw material cannot compete with other raw materials such as fiber glass or other fibrous materials also used as reinforcing fillers.

It was therefore the technical object of the invention to provide a simple method of reducing the dust behavior of silicates, particularly of wollastonite, which method would be practicable at a cost as low as possible and result in a substantial decrease in the dust behavior of wollastonite.

Said technical object is accomplished by subjecting the comminuted silicate, particularly wollastonite, to a surface coating using a polyorganosiloxane.

In contrast to previous surface coating using silanes, coating using polyorganosiloxanes was found to result in a substantial reduction of the dust behavior of much more than 50% as compared to prior art materials. Surface coating of silicates is a simple, cost-effective process. Thus, the appropriate surface coating agents normally are coated onto the surface by mixing the material in a fluid mixer. Furthermore, this technique has become well-tried in coating using appropriate silane compounds owing to this simple method of reducing the dust behavior of silicates, the previous multistage physical processes of reducing the dust behavior are no longer necessary and can be replaced in a simple fashion.

In particular, it has been surprising that the dust behavior in surface coating using appropriate silane compounds is not reduced or only to a minor degree, while coating using polyorganosiloxanes results in a significant reduction of the dust behavior. In this context, adequate comparative experiments were carried out which will be described in the experimental section of this application.

In a particularly preferred embodiment, a polyorganosiloxane in an amount of from 0.1 to 4 wt.-%, more preferably from 0.5 to 1.5 wt.-% is used in surface coating. A polysiloxane-polyether copolymer is employed as a particularly preferred polyorganosiloxane.

As has been mentioned above, these polyorganosiloxanes allow for a reduction of the dust behavior of silicates, particularly of calcium metasilicates, and in a particularly preferred fashion, of wollastonites.

Surprisingly, this dust-reducing surface coating was found to achieve good incorporation of the filler in the plastic material. By using the polyorganosiloxane compounds of the invention, the same effect is achieved as with the corresponding functional silane compounds known from prior art.

The invention is also directed to a silicate having reduced dust behavior, which silicate is surface-coated with a polyorganosiloxane, has a Heubach dust content of from 500 to 1200 mg/100 g, the silicate having a specific surface area of from 0.5 to 1.5 $m^2$/g, as measured according to DIN 66132-BET. The silicate preferably is a calcium metasilicate, and more preferably a wollastonite. The silicate preferably is surface-coated using from 0.1 to 4 wt.-%, more preferably from 0.5 to 1.5 wt.-% of polyorganosiloxane. A polysiloxane-polyether copolymer preferably is employed as polyorganosiloxane.

The silicate is used as a reinforcing filler in plastics, particularly in polyurethane, polyamide, and polypropylene. The silicate is produced by grinding the wollastonite on an appropriate size reduction unit, such as a counterflow impact grinding unit. The resulting comminuted product then is removed from the size reduction unit and surface coated with the polyorganosiloxane in a fluid mixer. Coating is effected at temperatures between 40 and 100° C. resulting from frictional heat. Following coating, the material is cooled to room temperature. A low-dust coated wollastonite having the above-mentioned properties is obtained as final product.

The product according to the invention will be characterized in more detail in the Figures which follow.

BRIEF DESCRIPTION OF THE FIGURES

FIG. 2 shows another FT-IR spectrum of the obtained product. Assessment is effected as an illustration of the absorbance as a function of the wave number in $cm^{-1}$. The wollastonite raw material has been subtracted mathematically from the FT-IR spectrum.

Ultimately.

DETAILED DESCRIPTION OF THE INVENTION

In a preferred fashion, this material is employed as a reinforcing filler in plastic materials, resulting in an improvement of the mechanical properties, particularly the tensile strength and reinforcement of the composite material. In a particularly preferred fashion, the use as a reinforcing filler is in plastic materials selected from the group of polyurethane, polyamide, polypropylene. Further advantages are to be seen in a high throughput capacity on extruders owing to good dispersibility and high thermal conductivity of the material, low shrinkage and high dimensional stability of the wollastonite-containing polymer masterbatch resulting from a reduction of the linear expansion coefficient. Plastic articles produced using this material as reinforcing filler have excellent surface quality owing to the finely particulate needle structure of the material. Furthermore, heat distortion resistance is improved and the creep tendency is reduced. By using the reinforcing fillers, an increase of the surface hardness of the masterbatch is achieved as a result of the hardness of the filler, with optimum incorporation of the material in the plastic.

Without intending to be limiting, the invention will be illustrated in more detail with reference to the Examples below.

EXAMPLES

Example 1

Production of Polyorganosiloxane-coated Wollastonite 1000 kg of wollastonite is comminuted on a counterflow impact grinding unit (Majac). The jet mill operates with 2 boron carbide nozzles at an operating pressure of 7 bars. The classifier used to separate non-comminuted coarse particles is operated at a rotationalispeed of 1800 rpm. Separation of the final product is effected in a filter.

75 kg of wollastonite thus comminuted is coated in a Thyssen-Henschel FM250D fluid mixer using 750 g of a polysiloxane-polyether copolymer (TEGOSTAB B 8427, TH. GOLDSCHMIDT AG, Essen, Germany).

The rotational speed of the mixing tools (bottom scraper, fluidizing blades, horn tools) is 1200 rpm. The.fluid mixer is double-walled and enables adjusting particular temperature patterns independent of the frictional heat by indirect heating with hot water or steam. The temperature pattern adjusted in the wollastonite reaches 80° C.

Thereafter, the coated wollastonite having a material temperature of 80° C. is cooled to room temperature in a doublewalled cooling mixer (Thyssen-Henschel Type 650). The mixing tools are comparable to the mixing tools of the fluid mixer. The rotational speed is 140 rpm.

A low-dust, coated wollastonite is obtained as final product.

Figure 1:
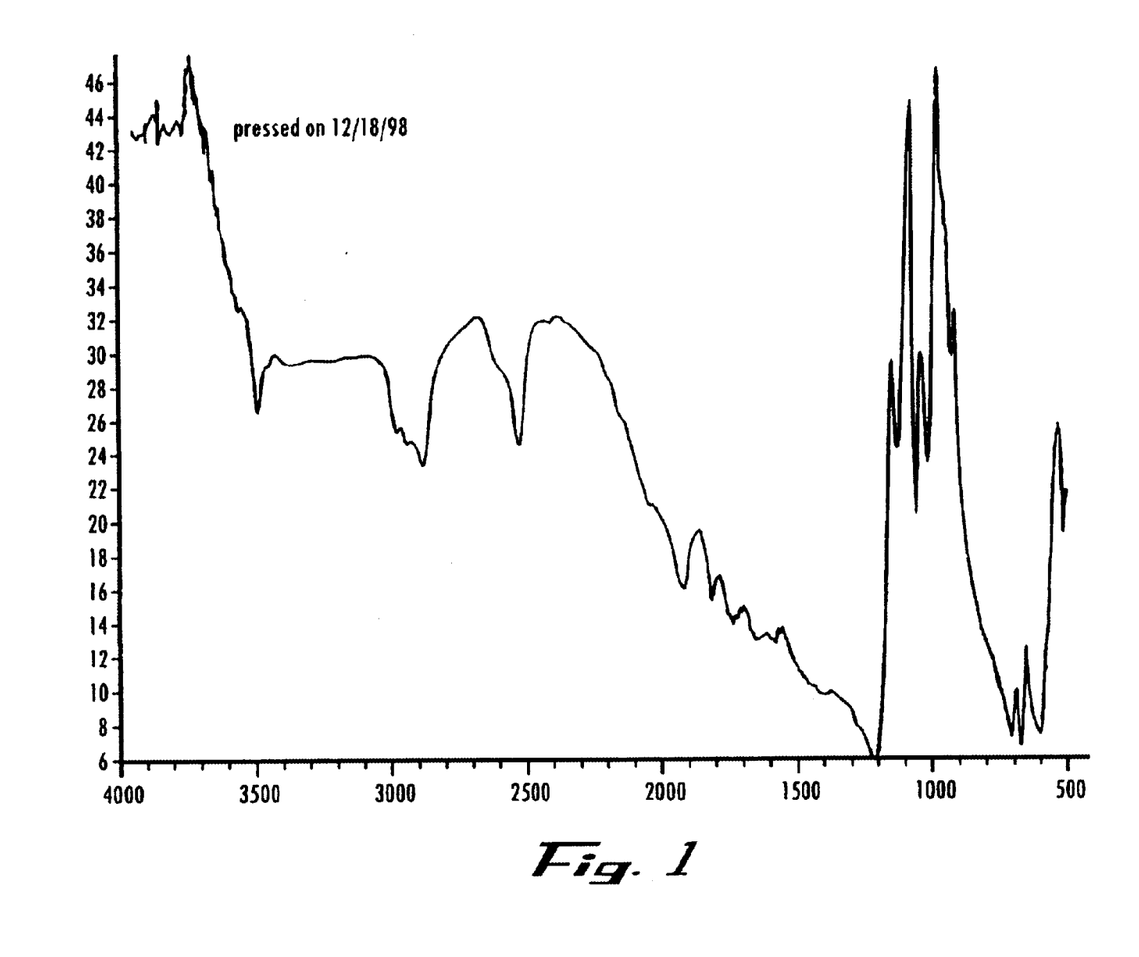
FIG. 1 shows an FT-IR spectrum of the obtained product as a pressed pellet. The Figure shows the transmittance in % as a function of the wave number in $cm^{-1}$.

FIG. 1 shows an FT-IR spectrum of the obtained product as a pressed pellet. The Figure shows the transmittance in % as a function of the wave number in $cm^{-1}$. The vibrational bands are characteristic for the polyorganosiloxane-coated wollastonite system.

Figure 2:
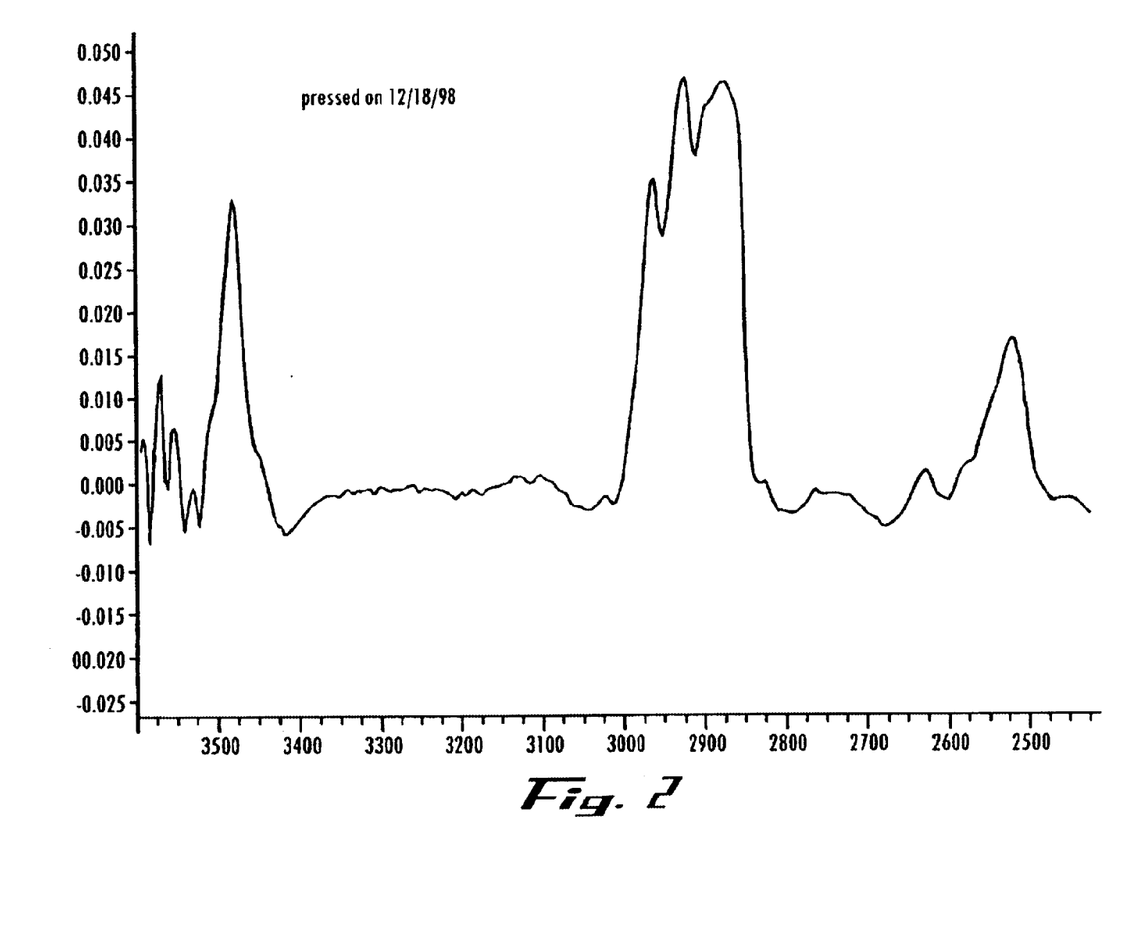

FIG. 2 shows another FT-IR spectrum of the obtained product. Assessment is effected as an illustration of the absorbance as a function of the wave number in $cm^{-1}$. Only wave numbers of from 2,400 to 3,600 have been covered, and the wollastonite raw material has been subtracted mathematically from the FT-IR spectrum within the scope of the present analysis. As a consequence, FIG. 2 merely shows the vibrational bands of the surface coating, namely, of the polyorganosiloxane on the surface of wollastonite, particularly in the wave number range of from 2,800 to 3,100. In particular, the CH vibrations are typical in this wave number range. Therefore, the illustration thus obtained is a characteristic fingerprint of the surface additive, describing the specific structure of the polyorganosiloxane employed.

Figure 3:
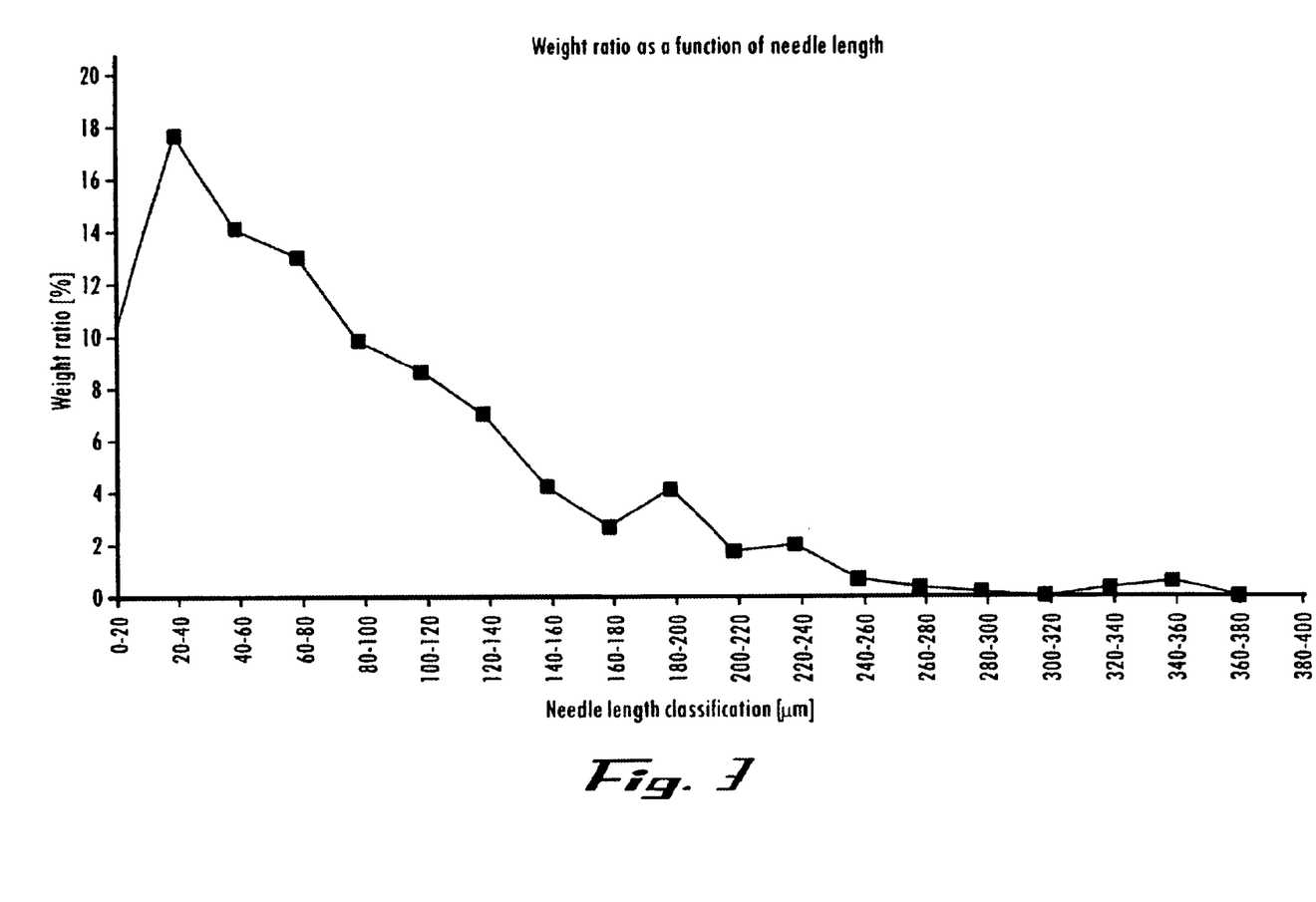
FIG. 3 shows the weight ratio of the product of the invention as a function of the needle length. Therein, the needle length is given in $\mu m$ needle length classifications.
Figure 4:
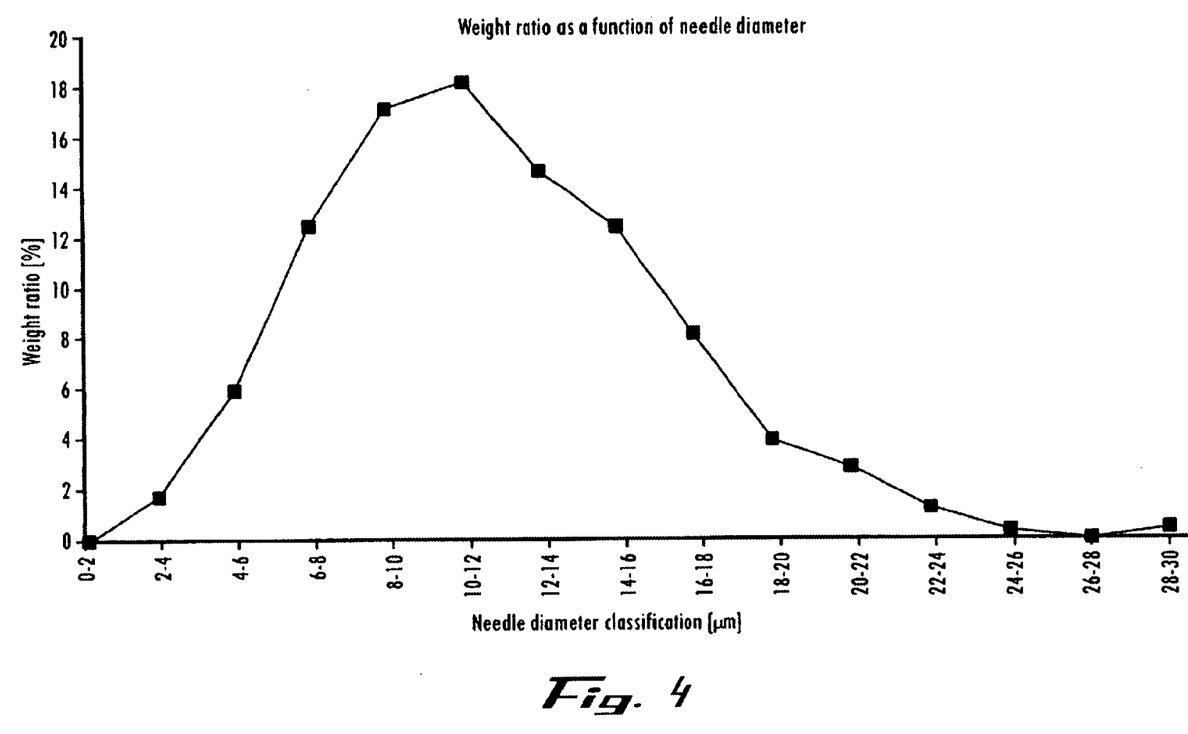
FIG. 4 shows the weight ratio of the product of the invention as a function of the needle diameter. Therein, the needle diameter is given in $\mu m$ needle diameter classifications.
Figure 5:
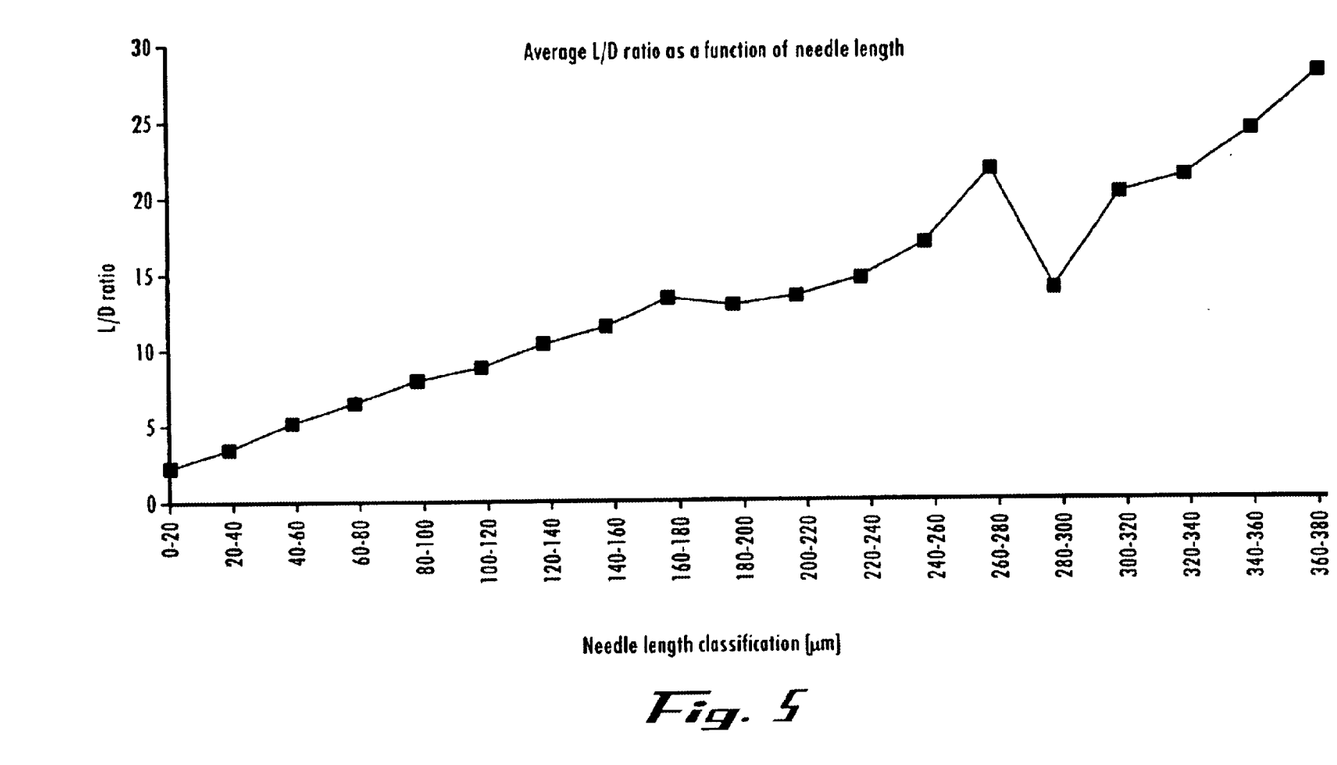
FIG. 5 shows the length/diameter average ratio of the product of the invention as a function of needle length. The needle length is given in $\mu m$ needle length classifications.

FIGS. 3, 4 and 5 characterize the obtained product with respect to needle length (FIG. 3), needle diameter (FIG. 4), and average L/D ratio (length/diameter), as a function of the needle length (FIG. 5).

Example 2

Dust Measurement

In this Example, the product of the invention produced according to Example 1 was examined for its dust behavior in comparison to prior art products. More specifically, the following products were tested:
a) wollastonite according to Example 1;
b) wollastonite with no additive (prior art);
c) wollastonite with aminosilane as additive (prior art).

The dust behavior was determined using the following method:
1. Dust measurement using the Heubach Dustmeter
2. Determination of the specific surface according to DIN 66132-BET
1. Dust Measurement Using the Heubach Dustmeter A Heubach Dustmeter, an analytical balance, as well as a filter GF 92 (S+S) are used in this investigation. The measuring instrument consists of a base instrument with air measurement (volume, temperature, driving motor, vacuum pressure pump). It includes brackets having     holders for mounted structures
    dust formation vessel
    coarse separator
    air filtration vessel
    Assembly The suction pipe with tube connector is screwed tightly on the threaded socket, the stabilizer pipe is fitted onto the bolt, fixed with the clamping block, and the foot is secured to the pipe ends. The short stand rods can be fixed at each position of the bracket. The desired array is furnished using the double sleeve and the stand clamp.

b) Function and Operation

The substance to be tested is kept in motion in the rotating dust formation vessel. The dust is taken up by an axially entering stream of air and is, moved past a coarse separator made of glass wherein coarse, non-dispersible particles undergo sedimentation. The dust remaining in the stream of air is deposited on a filter. The air pressure required in testing is generated by a vacuum pressure pump, the air meter measurement being effected on the pressure side.

c) Performing the Measurement

Adjusting the desired air flow:

An air volume of 100 l at a measuring period of 5 min (20 l /min) is recommended.

One unit of the counter corresponds to 0.1 l, i.e., for e.g. 100 l of air, "1000" must be preselected on the setpoint generator of the four-digit counter. The air filtration vessel covered with filter paper is connected to the pump, the needle valve on the flowmeter is fully opened, the power switch is actuated, the selector switch is disengaged (automatic operation), 20 l ("0200") is preselected on the setpoint generator. After pressing the "START" button, the pump is set in motion, switching off automatically after 20 l. The needle valve on the pump is opened or closed to such a degree that the preselected 20 l will be conveyed precisely within 1 min. Now, all of the following measurements will be effected at a flow rate of 20 l of air per minute.

d) Dust Measurement

The weighed test material is introduced in the dust formation vessel with 25 g, 50 g or 100 g, depending on the bulk density. Up to a bulk density of 0.5 g/ml, the initial weight should be 25 g or 50 g, and above that, 100 g.

Prior to beginning the measurement, the air filtration vessel covered with filter paper is weighed ($m_1$). The desired amount of air is preselected on the four-digit digital setpoint generator. Once all the connections from the dust formation vessel up to the pump are established, the "START" button is pressed, setting both the gear motor and the pump in operation. Once the preselected amount of air is reached, both of them will be stopped automatically. Reweighing of the filtration vessel furnishes $m_2$. Prior to weighing, the rubber plug remaining on the filter should be cleansed on its outside using a cleaning paper.

e) Standard Measuring Conditions for QW Products

In any case, air flowing through the measuring instrument is passed through an upstream drying tower in order to eliminate the effect of humidity on dust formation.

Air volume: 20 l/min

Measuring period: 5 min

Initial weight: 50 g

Filter: GF 92, Schleicher & Schüll f) Assessment

The dust formation number "s" corresponds to the amount of dust in mg formed from 100 g of test material under standardized conditions.

Said number is calculated according to the following equation:

$$s = \frac{m_2 - m_1}{m_0} \times 10^5$$

Therein:

$m_0$ represents the initial weight of sample in g;

$m_1$ represents the mass of the filter casing with inserted filter prior to measurement;

$m_2$ represents the mass of the filter casing with inserted filter after measurement.

The dust formation number "s" of all of the three samples was determined. Table 1 shows the dust formation number in mg/100 g.

TABLE 1

| Material | Dust formation number [mg/100 g] |
|---|---|
| Wollastonite of Example 1 | 700 |
| Wollastonite with no additive | 1200 |
| Wollastonite with aminosilane | 1500 |

As can be seen from Table 1, the wollastonite according to Example 1 has a dust formation number which is by 50% lower than that of prior art wollastonite coated with aminosilane.

2. Determination of the specific surface area according to DIN 66132-BET

In the following test, the specific surface area of the wollastonite according to Example 1 and of prior art comparative products was determined. The specific surface area is particularly high in materials having a high dust content, because dust has a large specific surface area. For these products, the following data were determined, which are illustrated in Table 2.

TABLE 2

| Material | Specific surface area [m²/g] |
|---|---|
| Wollastonite of Example 1 | 0.8 |
| Wollastonite with aminosilane | 1.2 |

As can be seen from Table 2, the specific surface area of the product according to the invention is lower than the specific surface area of wollastonite with aminosilane.

Example 3

Production of a Plastic (Polyurethane) Molded Article Including Reinforcing Wollastonite Filler Using the wollastonite product of Example 1 and a comparative product, namely, wollastonite coated with aminosilane, a plastic molded article having the following composition was produced:

Polyol

Polyether 64.4 parts by weight glycerol/85 PO/15 EO, OH number=35

Diethyltoluylenediamine 35 parts by weight

Diazabicyclooctane 0.5 parts by weight

Dibutyltin dilaurate 0.1 parts by weight

Semi-prepolymer

Polyether glycerol/85 PO/15 EO/OH number=35

Diphenylmethane-4, 4'-diisocyanate (NCO content 18%)

The mixing ratio was 100 parts by weight of polyol and 107 parts by weight of semi-prepolymer, as well as 20 parts by weight of wollastonite in the elastomer. Using the plastic material thus produced, a plastic molded article was injection-molded and examined for its mechanical properties. As illustrated in Table 4, the following results were obtained:

TABLE 4

|  | Wollastonite with aminosilane | Wollastonite of Example 1 |
|---|---|---|
| Shore D hardness (DIN 53505) | 63 | 64 |
| Tensile strength (DIN 53455) | 25 | 25 |
| Elongation at break, % (DIN 53455) | 100 | 130 |
| Modulus in flexure, MPa (DIN 53457) | 1600 | 1800 |
| Shrinkage, % (DIN 53464) | 0.5 | 0.4 |

As can be seen from the Table, the mechanical properties of the plastic material wherein the wollastonite of Example 1 is used are superior over the mechanical properties of conventionally reinforced plastic materials.

Example 4

Production of a Plastic (Polypropylene) Molded Article Including Reinforcing Wollastonite Filler A polypropylene copolymer is produced with a level of 20 wt.-% of wollastonite of Example 1 and with a comparative product, namely, wollastonite coated with alkylsilane. Using this material, a plastic molded article plastic is produced and its mechanical properties are determined. As illustrated in Table 5, the following results were obtained:

TABLE 5

|  | Wollastonite with alkylsilane | Wollastonite of Example 1 |
|---|---|---|
| Tensile strength, MPa (DIN 53455) | 18.4 | 19.1 |
| Elongation at break, % (DIN 53455) | 30.4 | 17.9 |
| Modulus in flexure, GPa (DIN 53457) | 2.266 | 2.233 |
| Impact strength (Izod) (kJ/m$^2$) | | |
| unnotched, Iso 180 | 50.4 | 89.0 |
| notched, Iso 180 | 19.0 | 23.5 |
| Heat distortion temperature HDT-B (° C.) DIN 53461 | 123 | 115 |

As can be seen from the Table, the mechanical properties of the plastic material wherein the wollastonite of Example 1 is used are improved over conventionally reinforced polypropylene.

What is claimed is:

1. A silicate having reduced dust behavior, wherein said silicate has been surface-coated with polysiloxane-polyether copolymer and exhibits the following properties:

specific surface area 9DIN66132-BET) 0.5 to 1.5m$^2$/g dust content (according to Heubach) 500–1200 mg/100 g.

2. The silicate according to claim 1, wherein said silicate is a calcium metasilicate.

3. The silicate according to claim 1, wherein said silicate is wollastonite.

4. The silicate according to claim 1, wherein said silicate has been surface-coated with 0.1 to 4 wt.-% of polysiloxane-polyether copolymer.

5. The silicate according to claim 1, wherein said silicate has been surfaceoated with 0.5 to 1.5 wt.-% of polysiloxane-polyether copolymer.

* * * * *

UNITED STATES PATENT AND TRADEMARK OFFICE
CERTIFICATE OF CORRECTION

PATENT NO.    : 6,830,739 B1  
DATED         : December 14, 2004  
INVENTOR(S)   : Norbert Fenten and Wilfried Wolf It is certified that error appears in the above-identified patent and that said Letters Patent is hereby corrected as shown below:

Title page,  
Item [73], Assignee, delete "Frechen" and insert -- Frenchen --.  
Item [57], ABSTRACT, insert after "polyorganociloxane" -- . The invention --.

Column 8,  
Line 35, delete "surfacecoated" and insert -- surface coated --.

Signed and Sealed this

Twenty-fourth Day of May, 2005

JON W. DUDAS  
*Director of the United States Patent and Trademark Office*